United States Patent
Cox et al.

(10) Patent No.: US 7,340,622 B2
(45) Date of Patent: **\*Mar. 4, 2008**

(54) METHOD AND APPARATUS FOR SELECTIVELY INCREASING THE OPERATING SPEED OF AN ELECTRONIC CIRCUIT

(75) Inventors: Keith A. Cox, Campbell, CA (US); William C. Athas, San Jose, CA (US)

(73) Assignee: Apple Inc., Cupertino, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/591,866

(22) Filed: Nov. 1, 2006

(65) Prior Publication Data

US 2007/0061603 A1    Mar. 15, 2007

Related U.S. Application Data

(63) Continuation of application No. 10/838,310, filed on May 3, 2004, now Pat. No. 7,171,570, which is a continuation-in-part of application No. 09/991,092, filed on Nov. 16, 2001, now Pat. No. 6,813,719.

(51) Int. Cl.
 *G06F 1/26* (2006.01)
(52) U.S. Cl. ............ 713/300; 713/320; 713/322; 713/323; 370/281; 370/478; 370/481; 375/132; 375/344
(58) Field of Classification Search ............ 713/300
 See application file for complete search history.

(56) References Cited

U.S. PATENT DOCUMENTS

| 5,940,786 | A  | 8/1999 | Steeby ............. 702/132 |
| 6,076,171 | A  | 6/2000 | Kawata ............. 713/501 |
| 6,091,255 | A  | 7/2000 | Godfrey ............ 324/760 |
| 6,230,279 | B1 | 5/2001 | Dewa et al. ........ 713/324 |
| 6,347,254 | B1 | 2/2002 | Lu ................... 700/29 |
| 6,845,456 | B1 | 1/2005 | Menezes et al. ..... 713/320 |

*Primary Examiner*—Nitin C. Patel
(74) *Attorney, Agent, or Firm*—Park, Vaughan & Fleming LLP; Anthony Jones

(57) ABSTRACT

One embodiment of the present invention provides a system that facilitates selectively increasing the operating frequency of an electronic circuit, such as a computer system. The system begins by operating in a low-power state with the frequency and voltage of the electronic circuit set to low levels. Upon recognizing the need for performance beyond the low power level, the electronic circuit enters the first-intermediate power state. In this first-intermediate power state, the frequency and voltage are set to first-intermediate levels. Upon recognizing the need for performance beyond the first-intermediate power state, the electronic circuit enters the maximum-sustainable power state. In this power state, the frequency and voltage are set to maximum sustainable levels. Upon recognizing the need for performance beyond the maximum-sustainable power state, the electronic circuit temporarily enters a boosted power state beyond the maximum-sustainable power state. In this boosted power state, the frequency and voltages are set to levels beyond the maximum sustainable levels.

30 Claims, 3 Drawing Sheets

| INTERVAL | POWER LEVEL | POWER STATE | INTERVAL TIME | PERFORMANCE LEVEL | INTERVAL GAIN OR LOSS | NET GAIN OR LOSS |
|---|---|---|---|---|---|---|
| T1 | 25% | LOW | 10ms | 50% | -5ms | -5ms |
| T2 | 50% | FIRST-INTERMEDIATE | 10ms | 70% | -3ms | -8ms |
| T3 | 100% | MAXIMUM-SUSTAINABLE | 10ms | 100% | 0ms | -8ms |
| T4 | 145% | BOOSTED | 40ms | 120% | +8ms | 0ms |

METHOD AND APPARATUS FOR SELECTIVELY INCREASING THE OPERATING SPEED OF AN ELECTRONIC CIRCUIT

RELATED APPLICATION

This application is a continuation of a U.S. patent application by Keith A. Cox and William C. Athas, entitled "Method and Apparatus for Selectively Increasing the Operating Speed of an Electronic Circuit," Ser. No. 10/838,310, filed 3 May 2004 now U.S. Pat. No. 7,171,570, which is a continuation-in-part application of a U.S. Patent Application by William C. Athas, entitled, "Method and Apparatus for Increasing the Operating Frequency of an Electronic Circuit," Ser. No. 09/991,092 (issued as U.S. Pat. No. 6,813,719 B2), filed 16 Nov. 2001. This application hereby claims priority under 35 U.S.C. § 120 to the above U.S. patent applications.

BACKGROUND

1. Field of the Invention

The present invention relates to the design of electronic circuits. More specifically, the present invention relates to a method and apparatus for selectively increasing the operating frequency of an electronic circuit.

2. Related Art

As computer system performance continues to increase at an exponential rate, the circuitry within the computer systems is forced to keep pace with ever-faster frequencies. These faster frequencies mean that the circuitry switches more often, which causes the circuit to consume more power. As the circuitry consumes more power, it produces more heat.

This heat must somehow be removed so that the temperature within the computer circuits does not exceed a maximum operating temperature. To this end, computer systems typically include a number of heat-dissipating components, such as heat sinks, cooling fans and heat pipes to dissipate thermal energy.

Unfortunately, providing these heat-dissipating components within a computer system can present a number of problems. First, these heat-dissipating components can significantly increase the volume and weight of a computer system, which is especially a problem for portable computer systems in which volume and weight must be minimized. Second, providing these heat-dissipating components can significantly increase the manufacturing cost of a computer system. Third, providing these heat-dissipating components can reduce reliability of a computer system, because components such as cooling fans, can fail. Furthermore, some of these components such as cooling fans, consume extra power and can thereby decrease battery life in a portable computer system.

In order to reduce the power consumption, many portable computer systems enter a power conservation mode whenever the computer system is not busy. During this power conservation mode, the computer system operates at reduced frequency and voltage levels to minimize the amount of power consumed by the computer system, and to thereby increase battery life. When the computer system becomes busy again, the frequency is increased to a maximum sustainable frequency. For many portable computer systems, this maximum sustainable frequency is determined by the capacity of the computer system to dissipate heat.

Note that this maximum sustainable frequency is determined by assuming that the computer system will operate continuously at this frequency. Most computer applications, however, do not perform computational work continuously. In fact, most applications tend to perform computational work for short, concentrated bursts between long idle periods when the computer system is waiting for user input. Hence, the maximum sustainable operating frequency is typically too conservative because it is based on the worst-case assumption that an application performs computational work continuously.

What is needed is a method and an apparatus for selectively increasing the operating frequency of a computer system.

SUMMARY

One embodiment of the present invention provides a system that facilitates selectively increasing the operating speed of an electronic circuit, such as a computer system, in order to balance power consumption with performance. The system begins in a low-power state with the frequency and voltage of the electronic circuit set to low levels. Upon recognizing the need for performance beyond the low power level, the electronic circuit enters the first-intermediate power state. In this first-intermediate power state, the frequency and voltage are set to first-intermediate levels. Upon recognizing the need for performance beyond the first-intermediate power state, the electronic circuit enters a maximum-sustainable power state. In this power state, the frequency and voltage are set to maximum sustainable levels. Upon recognizing the need for performance beyond the maximum-sustainable power state, the electronic circuit temporarily enters a boosted power state beyond the maximum-sustainable power state. In this boosted power state, the frequency and voltages are set to levels beyond the maximum sustainable levels.

In a variation of this embodiment, the electronic circuit resides for preset time intervals in the low-power state, the first-intermediate power state, and the maximum-sustainable power state, before transitioning to other states.

In a further variation, the electronic circuit resides in the boosted power state either for a preset time interval or until the electronic circuit exceeds a maximum thermal energy level.

In a further variation, the electronic circuit returns to the maximum-sustainable power state after residing in the boosted power state.

In a further variation, the electronic circuit activates a busy signal when the electronic circuit is busy performing computational work.

In a further variation, the electronic circuit returns to the low-power state from a given state if the busy signal is deactivated while the electronic circuit is in the given state.

In a further variation, the electronic circuit recovers computational work lost because of the lower operating speeds in the low-power state and the first-intermediate power state by temporarily operating above maximum sustainable frequency and voltage in the boosted power state.

In a further variation, upon recognizing the need for performance beyond the first-intermediate power state, the electronic circuit enters a second-intermediate power state before entering the maximum-sustainable power state.

In a further variation, upon recognizing the need for more performance beyond the second-intermediate power state, the electronic circuit enters one or more additional power states before entering the maximum-sustainable power state.

In a further variation, if the thermal energy of a cooling system associated with the electronic circuit exceeds a maximum level, the electronic circuit does not enter the boosted power state but instead enters the maximum-power state.

In a further variation, the thermal energy of the cooling system is determined by measuring the temperature of a heat sink within the cooling system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
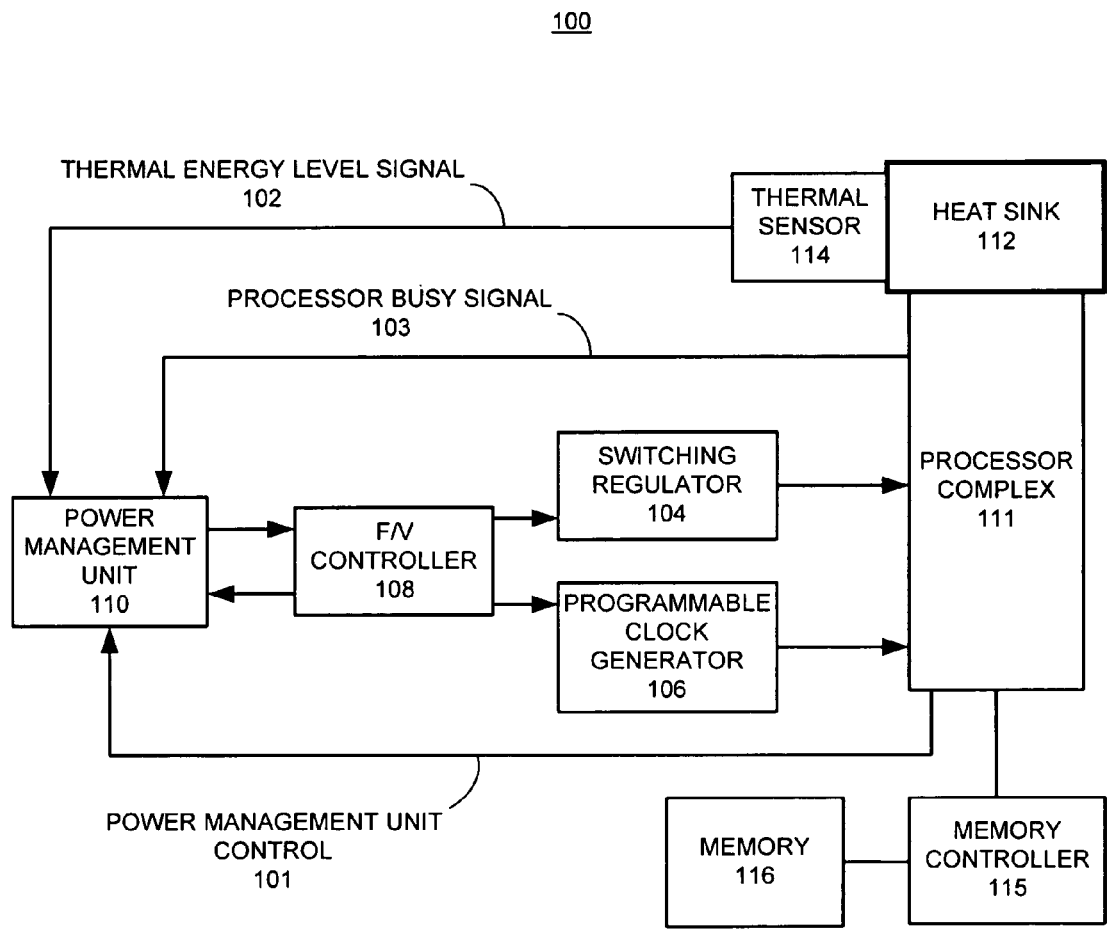
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

Computer system 100 includes a number of components, including one or more computational engines, such as microprocessors, located within processor complex 111. These processors are coupled to memory 116 through memory controller 115. Memory controller 115 can include any type of circuitry that coordinates accesses to memory 116. Memory 116 can include any type of random access memory for storing code and data to be accessed by processors within processor complex 111.

Computer system 100 also includes components related to controlling temperature. These components include heat sink 112, thermal sensor 114 and thermal energy level signal 102. Heat sink 112 dissipates heat from processor complex 111. Note that heat sink 112 can additionally dissipate heat from other heat-producing components within computer system 100. Thermal sensor 114 is coupled to heat sink 112. Thermal sensor 114 provides a measurement of the thermal energy level of heat sink 112 to power management unit 110 through thermal energy level signal 102.

Power management unit 110 controls the operating frequency and supply voltage for processor complex 111. Power management unit 110 raises or lowers the frequency and voltage levels for computer system 100 in response to signals received from power management unit control 101, thermal energy level signal 102 and processor busy signal 103. Power management unit 110 does so by communicating with a special-purpose frequency/voltage controller 108, which sets the DC voltage for switching regulator 104 and selects the output frequency for programmable clock frequency generator 106.

Processor complex 111 also communicates processor busy signal 103 to power management unit 110. Processor busy signal 103 is asserted when processor complex 111 is performing a computational task. Otherwise, processor busy signal 103 is not asserted.

Programmable clock frequency generator 106 can be implemented in a number of ways. One implementation uses multiple phase-lock loops (PLLs). Another implementation uses a single PLL, which includes divided outputs for the different frequencies (e.g., divide-by-two).

In an alternative embodiment of the present invention, some or all of the power management unit 110, frequency/voltage controller 108, switching regulator 104 and programmable clock frequency generator 106 are implemented within processor complex 111 through software.

When the processors are not executing computationally intensive tasks, the system operates processor complex 111 at low frequency and voltage levels. Note that for typical users and applications, the ratio between idle or near-idle time and computationally intensive time is high. Processor complex 111 therefore generally operates at the lower frequency and voltage for a significant portion of its overall operating time.

Heat sink 112 has sufficient capacity to dissipate the thermal energy generated by processor complex 111 while processor complex 111 is operating at a maximum-sustainable speed. When processor complex 111 is operating at lower speeds the excess thermal energy dissipation capacity of the heat sink 112 leads to a lower operating temperature.

Process of Selectively Controlling Operating Frequency and Voltage

Figure 2:
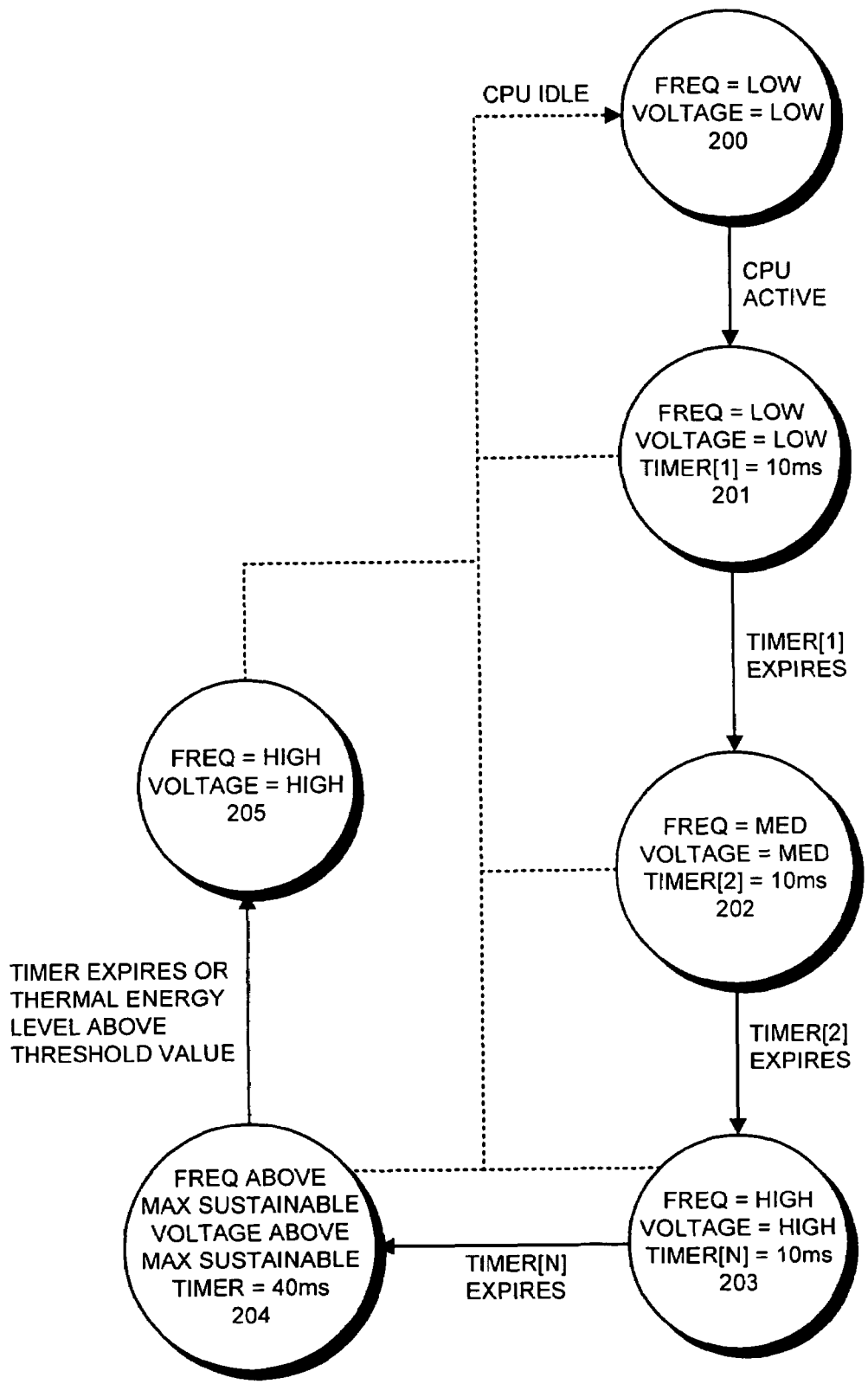
FIG. 2 illustrates a state-diagram of the transition between power states of the electronic circuit in accordance with an embodiment of the present invention.

FIG. 2 presents a flowchart illustrating the process of controlling an operating frequency and voltage for an electronic circuit in accordance with an embodiment of the present invention.

The process starts with the electronic circuit operating in a low-power state (200). In the low-power state, the electronic circuit is operating with low voltage and frequency (for example, a voltage of 1.1V and a frequency of 800 MHz), thereby minimizing power consumption.

When the electronic circuit starts to perform computational work, timer[1] is activated (201). While timer[1] is counting down, the electronic circuit continues to operate in the low-power state.

When timer[1] expires, the electronic circuit enters a first-intermediate state by increasing the voltage to a first-intermediate voltage, such as 1.2 V, increasing the frequency to a first-intermediate frequency, such as 1 GHz. and starting timer[2] (202). In the first-intermediate state, the power consumption of the electronic circuit is below its maximum level, but the performance is also below its maximum level.

When timer[2] expires, the electronic circuit enters the maximum-sustainable power state by increasing the voltage to a maximum sustainable voltage, such as 1.3 V, increasing the frequency to a maximum sustainable frequency, such as 1.2 GHz, and starting timer[N] (203). In the maximum-sustainable power state, the power consumption and performance of the electronic circuit are at the highest levels that the circuit can maintain continuously.

When timer[N] expires, if the thermal energy level of the electronic circuit is above a threshold value, the circuit remains in the maximum-sustainable power state (205). Alternatively, if the thermal energy level is below the threshold value when timer[N] expires, the electronic circuit enters the boosted power state by increasing the voltage to a voltage that exceeds the maximum sustainable voltage, such as 1.5 V, increasing the frequency to a frequency that exceeds the maximum sustainable frequency, such as 1.5 GHz, and starting a boosted power state timer (204). In this boosted power state, the power consumption and performance of the electronic circuit are above maximum sustainable levels. Note that the electronic circuit can only operate in this boosted power state for a limited time because the thermal energy of the electronic circuit exceeds the heat removing capacity of the cooling system. The thermal energy level of the system will consequently rise until it exceeds a threshold value.

If the thermal energy level exceeds the threshold value while the electronic circuit is operating in the boosted power state, the electronic circuit immediately exits the boosted power state and returns to a maximum-sustainable power state (205).

When the boosted power state timer expires, the electronic circuit reenters the maximum-sustainable power state by decreasing the voltage to a maximum sustainable voltage, such as 1.3 V, and decreasing the frequency to a maximum sustainable frequency, such as 1.2 GHz (205).

Regardless of the state of operation, whenever the electronic circuit is no longer performing computational work, the electronic circuit immediately returns to the low-power state (200).

Note that the single intermediate state can include one or more additional intermediate states, with different voltage and frequency levels.

Balancing Circuit Performance and Power Savings

Figures 3A, 3B:
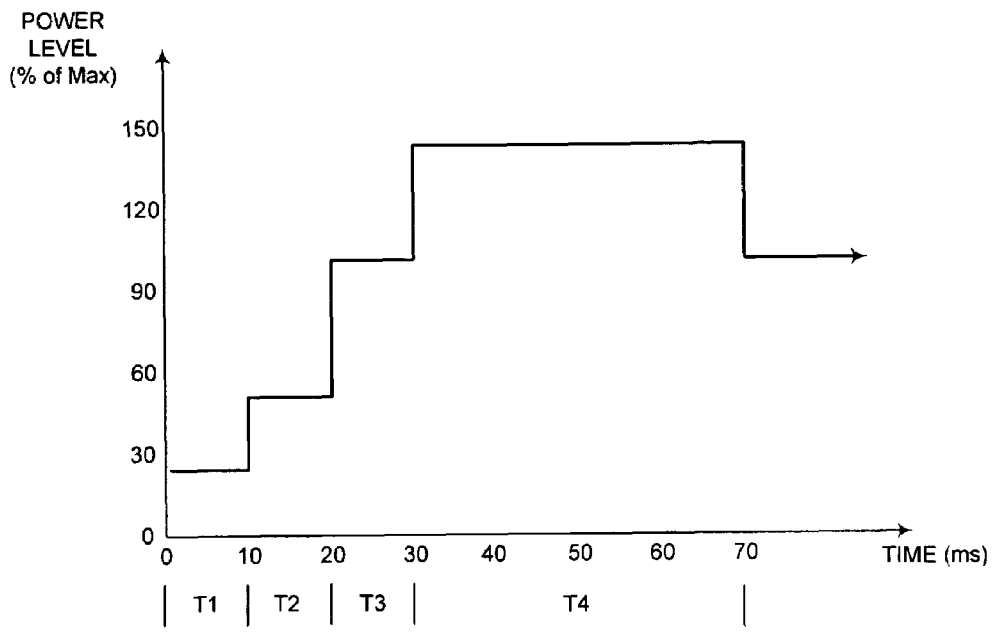
FIG. 3A illustrates four possible power states of the electronic circuit in accordance with an embodiment of the present invention.
FIG. 3B presents a table illustrating the computational work done by the electronic circuit in a given time in accordance with the power states of FIG. 3A.

FIG. 3A presents a graph of power level versus time in accordance with one embodiment of the present invention. The power-level axis of the graph indicates the operating power level of the electronic circuit as a percentage of the maximum sustainable level. The time axis indicates the progression of time.

FIG. 3B presents a tabular form of the information presented graphically in FIG. 3A. The "Interval" and "Power Level" headings in FIG. 3B relate directly to the axis on in FIG. 3A. The "Power State" heading in FIG. 3B relates to the power state name associated with a given "Power Level." The "Interval Time" shows the time that the electronic circuit resides in the associated "Power State." The "Performance Level" heading in FIG. 3B shows the performance level of the electronic circuit as a percentage of the maximum sustainable performance level. The "Interval Gain or Loss" and the "Net Gain or Loss" in FIG. 3B are effective computational work gains and losses with respect to the possible computational work that could be completed by running the electronic circuit in the maximum-sustainable power state for the same time interval.

In a given time interval, the electronic circuit performs an amount of computational work that is proportional to the operating frequency of the electronic circuit. Note that power level is approximately related to frequency by $P \propto V^2 f$. Since power is proportional to frequency, the power level associated with a given power state is directly correlated to the amount of computational work that the electronic circuit can perform in that power state.

As shown in FIG. 3B, in the "T1" interval, the electronic circuit initially operates in the low-power state. The system stays in the low-power state for 10 ms and operates at 25% power and 50% performance as illustrated in FIG. 3A. The effective computational work lost while operating in the low-power state is 5 ms, as shown in the "Interval Gain or Loss" column of interval "T1" of FIG. 3B. In other words, the electronic circuit has to run for an additional 5 ms in the maximum-sustainable power state to compensate for the work lost while executing in the low-power state.

In the "T2" interval of FIG. 3B, the electronic circuit enters a first-intermediate power state. The system operates stays in the first-intermediate power state for 10 ms and operates at 50% power and 70% performance as illustrated in FIG. 3A. While operating in the first-intermediate power state, the electronic circuit loses 3 ms of computational work. The electronic circuit is now 8 ms behind, as shown in the "Net Gain or Loss" column for interval "T2" in FIG. 3B.

In the "T3" interval of FIG. 3B, the electronic circuit enters the maximum-sustainable power state. The system stays in the maximum-sustainable power state for 10 ms and operates at 100% power and 100% performance as illustrated in FIG. 3A. Since the electronic circuit is operating in the maximum-sustainable power state, no computational work is lost. The electronic circuit remains 8 ms behind, as shown in the "Net Gain or Loss" column for interval "T3" in FIG. 3B.

In the "T4" interval of FIG. 3B, the electronic circuit enters the boosted power state. The system stays in the boosted power state for 40 ms and operates at 145% power and 120% performance as illustrated in FIG. 3A. The computational work gained by operating in the boosted power state is 8 ms. Hence, the electronic circuit has recovered the computational work lost in the preceding states and is 0 ms behind, as shown in the "Net Gain or Loss" column for interval "T4" in FIG. 3B.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for progressively and selectively increasing an operating speed of an electronic circuit beyond a maximum sustainable operating frequency upon recognizing a need for greater performance, the method comprising:

operating the electronic circuit in a low-power state, wherein the operating frequency and a voltage of the electronic circuit are set to low levels;

entering one or more intermediate power states up to a maximum sustainable power state, by increasing the operating frequency and voltage of the electronic circuit to the corresponding intermediate levels, up to a maximum sustainable level, wherein the maximum sustainable level is the highest level of power consumption of the electronic circuit to continuously operate without exceeding an associated capacity of heat dissipation; and temporarily entering a boosted power state by increasing the operating frequency and voltage of the electronic circuit beyond the maximum sustainable level.

2. The method of claim 1, wherein the electronic circuit resides for preset time intervals in each of the low-power state, the intermediate power states, and the maximum-sustainable power state before transitioning to the other states.

3. The method of claim 1, wherein the electronic circuit resides in the boosted power state for a preset time interval or until the electronic circuit exceeds a maximum thermal energy level.

4. The method of claim 3, wherein the electronic circuit returns to the maximum-sustainable power state after residing in the boosted power state.

5. The method of claim 1, wherein the electronic circuit activates a busy signal when the electronic circuit is performing computational work.

6. The method of claim 5, wherein the electronic circuit returns to the low-power state from a given state if the busy signal is deactivated while the electronic circuit is in the given state.

7. The method of claim 1, wherein the electronic circuit recovers computational work lost because of the lower operating speeds in the low-power state and the intermediate power states by temporarily operating above maximum sustainable frequency and voltage in the boosted power state.

8. The method of claim 1, wherein if a thermal energy level of a cooling system exceeds a maximum thermal energy level, the method further comprises preventing the electronic circuit from entering the boosted power state and instead forcing the electronic circuit to enter the maximum sustainable power state.

9. The method of claim 8, wherein measuring the thermal energy level of the cooling system involves measuring a temperature of a heat sink within the cooling system.

10. The method of claim 1, wherein the electronic circuit includes a computer system.

11. An apparatus that progressively and selectively increases an operating speed of an electronic circuit beyond a maximum sustainable operating frequency upon recognizing a need for greater performance, the apparatus comprising:

the electronic circuit;

a thermal sensor configured to determine a thermal energy level of a cooling system for the electronic circuit;

a controller configured to vary a voltage and a frequency of the electronic circuit;

wherein the controller is configured to operate the electronic circuit in a low-power state, wherein the frequency and the voltage of the electronic circuit are set to low levels;

wherein the controller is configured to enter one or more intermediate power states, up to a maximum sustainable power state, by increasing the frequency and voltage of the electronic circuit to the corresponding intermediate levels, up to a maximum sustainable level, wherein the maximum sustainable level is the highest level of power consumption of the electronic circuit to continuously operate without exceeding an associated capacity of heat dissipation; and the controller is configured to temporarily enter a boosted power state by increasing the frequency and voltage of the electronic circuit beyond the maximum sustainable level.

12. The apparatus of claim 11, wherein the controller is configured so that the electronic circuit resides for preset time intervals in each of the low-power state, the intermediate power states, and the maximum-sustainable power state before transitioning to the other states.

13. The apparatus of claim 11, wherein the controller is configured so that the electronic circuit resides in the boosted power state for a preset time interval or until the electronic circuit exceeds a maximum thermal energy level.

14. The apparatus of claim 13, wherein the controller is configured so that the electronic circuit returns to the maximum-sustainable power state after residing in the boosted power state.

15. The apparatus of claim 11, wherein the electronic circuit is configured to activate a busy signal when the electronic circuit is performing computational work.

16. The apparatus of claim 15, wherein the controller is configured so that the electronic circuit returns to the low-power state from a given state if the busy signal is deactivated while the electronic circuit is in the given state.

17. The apparatus of claim 11, wherein the controller is configured so that the electronic circuit recovers computational work lost because of the lower operating speeds in the low-power state and the intermediate power states by temporarily operating above maximum sustainable frequency and voltage in the boosted power state.

18. The apparatus of claim 11, wherein if a thermal energy level of a cooling system exceeds a maximum thermal energy level, the controller is configured to prevent the electronic circuit from entering the boosted power state and instead force the electronic circuit to enter the maximum sustainable power state.

19. The apparatus of claim 11, wherein the electronic circuit is a computer system.

20. A computer system that is configured to progressively and selectively increase its operating frequency beyond a maximum sustainable operating frequency upon recognizing a need for greater performance, the system comprising:

a processor;

a memory;

a thermal sensor configured to determine a thermal energy level of a cooling system for an electronic circuit in the computer system; and a controller configured to vary a voltage and a frequency of the electronic circuit;

wherein the controller is configured to operate the electronic circuit in a low-power state, wherein the frequency and the voltage of the electronic circuit are set to low levels;

wherein the controller is configured to enter one or more intermediate power states up to a maximum-sustainable power state by increasing the frequency and voltage of the electronic circuit to the corresponding intermediate levels, up to a maximum-sustainable level, wherein the maximum sustainable level is the highest level of power consumption of the electronic circuit to continuously operate without exceeding an associated capacity of heat dissipation; and wherein the controller is configured to temporarily enter a boosted power state by increasing the frequency and voltage of the electronic circuit beyond the maximum sustainable level.

21. A computer-readable storage medium for storing instructions that when executed by a computer system cause the computer system to perform a method for progressively and selectively increasing an operating speed of an electronic circuit beyond a maximum sustainable operating frequency upon recognizing a need for greater performance, the method comprising:
   operating the electronic circuit in a low-power state, wherein a frequency and a voltage of the electronic circuit are set to low levels;
   entering one or more intermediate power states up to a maximum sustainable power state, by increasing the frequency and voltage of the electronic circuit to the corresponding intermediate levels, up to a maximum sustainable level, wherein the maximum sustainable level is the highest level of power consumption of the electronic circuit to continuously operate without exceeding an associated capacity of heat dissipation; and
   temporarily entering a boosted power state by increasing the frequency and voltage of the electronic circuit beyond the maximum sustainable level.

22. The computer-readable storage medium of claim 21, wherein the electronic circuit resides for preset time intervals in each of the low-power state, the intermediate power states, and the maximum-sustainable power state before transitioning to the other states.

23. The computer-readable storage medium of claim 21, wherein the electronic circuit resides in the boosted power state for a preset time interval or until the electronic circuit exceeds a maximum thermal energy level.

24. The computer-readable storage medium of claim 23, wherein the electronic circuit returns to the maximum-sustainable power state after residing in the boosted power state.

25. The computer-readable storage medium of claim 21, wherein the electronic circuit activates a busy signal when the electronic circuit is performing computational work.

26. The computer-readable storage medium of claim 25, wherein the electronic circuit returns to the low-power state from a given state if the busy signal is deactivated while the electronic circuit is in the given state.

27. The computer-readable storage medium of claim 21, wherein the electronic circuit recovers computational work lost because of the lower operating speeds in the low-power state and the intermediate power states by temporarily operating above maximum sustainable frequency and voltage in the boosted power state.

28. The computer-readable storage medium of claim 21, wherein if a thermal energy level of a cooling system exceeds a maximum thermal energy level, the method further comprises preventing the electronic circuit from entering the boosted power state and instead forcing the electronic circuit to enter the maximum sustainable power state.

29. The computer-readable storage medium of claim 28, wherein measuring the thermal energy level of the cooling system involves measuring a temperature of a heat sink within the cooling system.

30. The computer-readable storage medium of claim 21, wherein the electronic circuit is the computer system.

\* \* \* \* \*